United States Patent
Suetake

(10) Patent No.: US 7,434,079 B2
(45) Date of Patent: Oct. 7, 2008

(54) MICROCOMPUTER, METHOD OF CONTROLLING CACHE MEMORY, AND METHOD OF CONTROLLING CLOCK

(75) Inventor: Seiji Suetake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 270 days.

(21) Appl. No.: 11/299,893

(22) Filed: Dec. 13, 2005

(65) Prior Publication Data

US 2006/0095810 A1  May 4, 2006

Related U.S. Application Data

(62) Division of application No. 10/355,177, filed on Jan. 31, 2003, now Pat. No. 7,007,134.

(30) Foreign Application Priority Data

Mar. 4, 2002 (JP) ............................. 2002-057351

(51) Int. Cl.
*G06F 1/12* (2006.01)
*G06F 1/00* (2006.01)
*G06F 13/00* (2006.01)

(52) U.S. Cl. ...................... 713/400; 713/500; 711/118
(58) Field of Classification Search ................. 713/300, 713/320, 322, 400, 500
See application file for complete search history.

(56) References Cited

U.S. PATENT DOCUMENTS

| 5,235,692 | A | * | 8/1993 | Ayres et al. ................... 710/29 |
| 5,319,760 | A | | 6/1994 | Mason et al. |
| 5,623,647 | A | * | 4/1997 | Maitra ........................ 713/501 |
| 5,974,438 | A | | 10/1999 | Neufeld |
| 6,230,230 | B1 | | 5/2001 | Joy et al. |
| 6,751,706 | B2 | | 6/2004 | Chauvel et al. |
| 6,757,771 | B2 | | 6/2004 | Christie |
| 2003/0204757 | A1 | * | 10/2003 | Flynn ........................ 713/310 |
| 2005/0064829 | A1 | * | 3/2005 | Kang et al. .............. 455/127.1 |
| 2005/0141184 | A1 | * | 6/2005 | Suzuki et al. ............... 361/683 |

* cited by examiner

*Primary Examiner*—Suresh K Suryawanshi
(74) *Attorney, Agent, or Firm*—Staas & Halsey LLP

(57) ABSTRACT

A microcomputer that can increase the usage efficiency of a cache memory and increase the process speed is provided. In this microcomputer, a group of registers hold cache usage information that specifies whether the cache memory is to be used in execution of a process. When processes to be executed are switched, a process switch control circuit obtains the cache usage information of the next process from the group of registers, and stores the cache usage information in a first register. After the storing of the cache usage information in the first register, a cache control circuit stores the cache usage information in a second register. In accordance with the cache usage information stored in the second register, the cache control circuit puts the cache memory in a usable state or an unusable state.

5 Claims, 14 Drawing Sheets

MICROCOMPUTER, METHOD OF CONTROLLING CACHE MEMORY, AND METHOD OF CONTROLLING CLOCK

CROSS-REFERENCE TO RELATED APPLICATIONS

This application is a divisional application of application Ser. No. 10/355,177 filed on Jan. 31, 2003, now U.S. Pat. No. 7,007,134 now pending and also claims the benefits of priority from the prior Japanese Patent Application No. 2002-057351, filed on Mar. 4, 2002, the entire contents of which are incorporated herein by reference.

BACKGROUND OF THE INVENTION

1. Field of the Invention

The present invention relates to microcomputers, methods of controlling cache memories, and methods of controlling clocks, and more particularly, to a microcomputer that controls a cache memory and a clock so as to increase the process speed, a method of controlling the cache memory, and a method of controlling the clock.

2. Description of the Related Art

In recent years, a microcontroller has a built-in cache memory so as to reduce access to low-speed peripheral memories as much as possible, and thereby increase the process speed. In such a microcontroller, certain instructions are written in the program, so that the use of the cache memory can be controlled.

FIG. 13 is a block diagram showing the inner structure of a conventional microcontroller. A microcontroller 7 includes a CPU (Central Processing Unit) 70 that executes process routines, a cache memory 71 that stores a part of or all of a process routine which the CPU 70 frequently accesses, a cache control circuit 72 that determines whether the cache memory 71 can be used, and an interrupt controller 73 that determines an interrupt factor of the peripheral device from its priority level or masking state, and then transmits an interrupt request signal to the CPU 70. A ROM (Read Only Memory) 8 that stores process routines to be executed by the CPU 70 is connected to the microcontroller 7. The cache control circuit 72 includes a register 72a in which the usage status of the cache memory 71 is set.

FIG. 14 is a process transition chart of the CPU 70 of the conventional microcontroller 7. As shown in FIG. 14, the CPU 70 of the microcontroller 7 is to execute a main routine to perform a regular operation, and an interrupt routine corresponding to an interrupt factor 1. The main routine is executed through the cache memory 71, while the interrupt routine is executed without the cache memory 71.

When the interrupt factor 1 enters the interrupt controller 73, the interrupt controller 73 transmits an interrupt request signal to the CPU 70. Upon receipt of the interrupt request signal, the CPU 70 suspends the execution of the main routine, and starts executing the interrupt routine.

At this point, a cache-OFF instruction is written at the top of the program in which the interrupt routine has been written, so that the CPU 70 executes the interrupt routine without the cache memory 71. The CPU 70 executes the cache-OFF instruction, and stores the information that the cache memory 71 is not usable in the register 72a. In accordance with the information stored in the register 72a, the cache control circuit 72 prohibits the CPU 70 from using the cache memory 71. Thus, after the CPU 70 executes the cache-OFF instruction, the cache memory 71 is disabled.

When the execution of the interrupt routine is completed, a cache-ON instruction and a return instruction are written at the end of the program in which the interrupt routine has been written, so that the CPU 70 resumes the execution of the main routine using the cache memory 71. The CPU 70 executes the cache-ON instruction, and stores the information that the cache memory 71 is usable in the register 72a. In accordance with the information stored in the register 72a, the cache control circuit 72 cancels the prohibition on use of the cache memory 71. Thus, after the CPU 70 executes the cache-ON instruction, the cache memory 71 is enabled.

In the above conventional manner, the information for controlling the cache memory 71 needs to be stored in the register 72a after execution of a program. As a result, the cache-OFF instruction and the return instruction might be stored in the cache memory 71, as shown in FIG. 14. If so, the remaining capacity of the cache memory 71 becomes smaller, and a part of the main routine to be stored in the cache memory 71 might fail to be stored in the cache memory 71.

As described above, a part of the process routine to be stored in the cache memory and executed sometimes fail to be stored in the cache memory in the prior art. This results in a poor usage efficiency of the cache memory, and a decrease of the process speed.

SUMMARY OF THE INVENTION

Taking into consideration the above, it is an object of the present invention to provide a microcomputer that makes efficient use of a cache memory, and operates at a higher process speed.

The above object of the present invention is achieved by a microcomputer equipped with a cache memory. This microcomputer includes: a process switch control circuit that includes a first register, and stores cache usage information specifying cache memory usage rules for execution of the next process in the first register every time processes to be executed are switched; and a cache control circuit that includes a second register, and stores the cache usage information in the second register after the cache usage information has been stored in the first register, and performs data input and output on the cache memory in accordance with the cache memory usage rules specified by the cache usage information stored in the second register.

The above object of the present invention is also achieved by a microcomputer that executes a process in synchronization with a clock. This microcomputer includes: a process switch control circuit that includes a first register, and stores clock usage information specifying which clock is to be used for execution of the next process in the first register every time processes to be executed are switched; and a clock control circuit that includes a second register, and stores the clock usage information in the second register after the clock usage information has been stored in the first register, and selects and outputs a clock from a plurality of clocks in accordance with the clock usage information stored in the second register.

The above and other objects, features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

The following is a description of embodiments of the present invention, with reference to the accompanying drawings.

Figure 1:
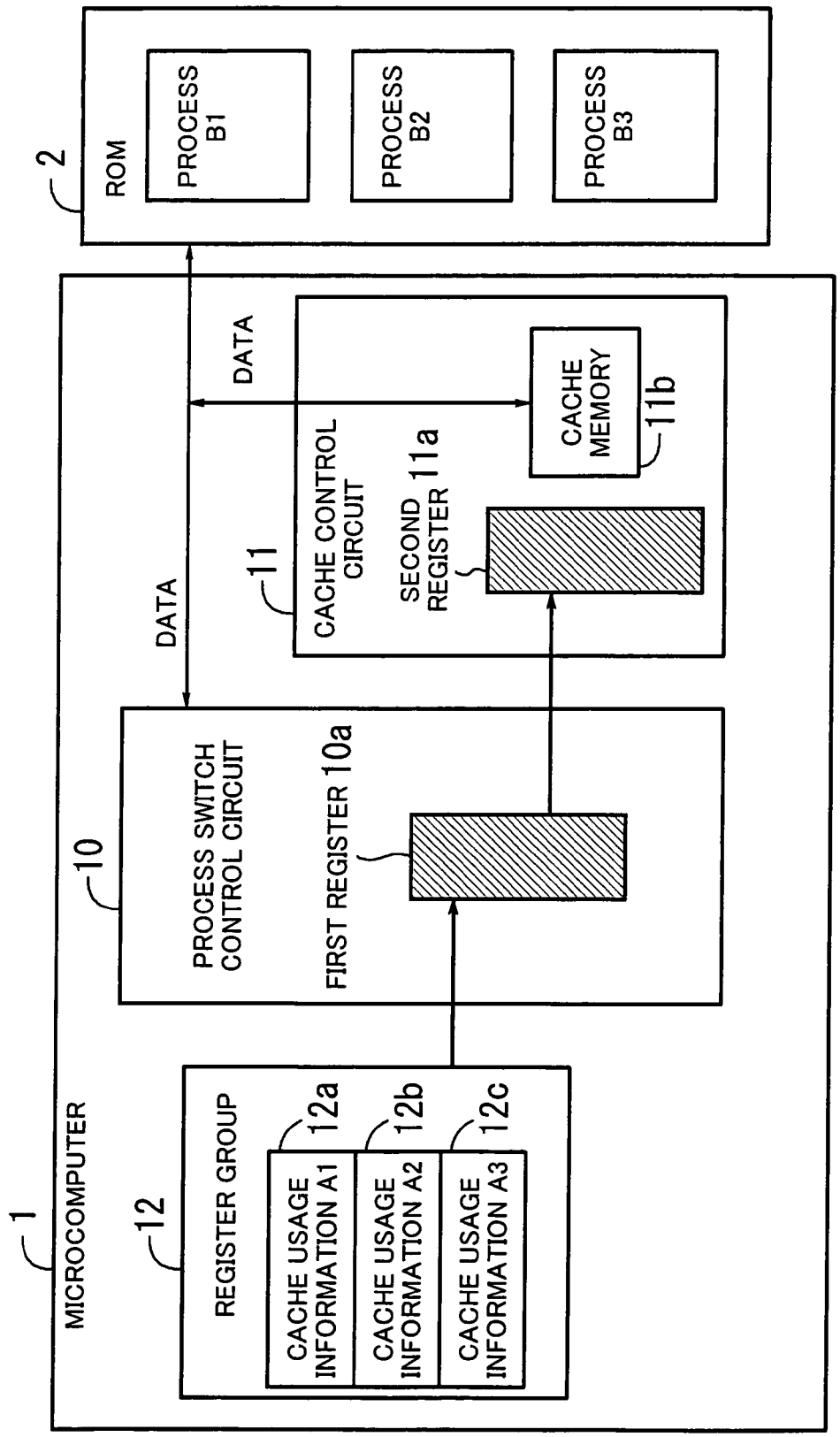
FIG. 1 illustrates the principles of the present invention.

FIG. 1 illustrates the principles of the present invention.

In this figure, a microcomputer 1 includes a process switch control circuit 10, a cache control circuit 11, and a register group 12. A ROM 2 is connected to the microcomputer 1.

The process switch control circuit 10 includes a first register 10a. Every time processes to be executed are switched, the process switch control circuit 10 stores cache usage information in the first register 10a. The cache usage information specifies the cache memory usage rules in the next process to be executed.

The cache control circuit 11 includes a second register 11a and a cache memory 11b. After the cache usage information is stored in the first register 10a, the cache control circuit 11 obtains and stores the cache usage information in the second register 11a. In accordance with the usage rules that are specified by the cache usage information stored in the second register 11a, the cache control circuit 11 performs a data input/output operation on the cache memory 11b.

The register group 12 includes registers 12a, 12b, and 12c. Cache usage information A1, A2, and A3 specifying the usage rules of the cache memory 11b are stored in the registers 12a, 12b, and 12c, respectively.

Processes B1, B2, and B2 to be executed by the process switch control circuit 10 are stored in the ROM 2.

More specifically, the cache usage information A1 specifies that the cache memory 11b should be used when the process switch control circuit 10 executes the process B1. The cache usage information A2 specifies that the cache memory 11b should not be used when the process switch control circuit 10 executes the process B2. The cache usage information A3 specifies that the cache memory 11b should be used when the process switch control circuit 10 executes the process B3.

In the following, the operation illustrated in FIG. 1 will be described in detail.

First, the process switch control circuit 10 is to execute the process B1. The cache usage information A1 obtained from the register 12a is stored in the first register 10a. The cache usage information A1 is also stored in the second register 11a of the cache control circuit 11. Accordingly, the process switch control circuit 10 executes the process B1 using the cache memory 11b of the cache control circuit 11.

The process switch control circuit 10 then switches from the process B1 to the process B2. At this point, the process switch control circuit 10 obtains the cache usage information A2 relating to the next process B2 from the register 12b, and stores the cache usage information A2 in the first register 10a.

After the cache usage information A2 is stored in the first register 10a, the cache control circuit 11 stores the cache usage information A2 also in the second register 11a.

The cache switch control circuit 10 then executes the process B2, with the cache usage information A2 specifying that the cache memory 11b should not be used being stored in the second register 11a of the cache control circuit 11. In accordance with the cache usage information A2 stored in the second register 11a, the cache control circuit 11 prohibits data input and output of the cache memory 11b. Accordingly, the process switch control circuit 10 executes the process B2 without the cache memory 11b of the cache control circuit 11.

The process switch control circuit 10 further switches from the process B2 to the process B3. At this point, the process switch control circuit 10 obtains the cache usage information A3 relating to the next process B3 from the register 12c, and stores the cache usage information A3 in the first register 10a.

After the cache usage information A3 is stored in the first register 10a, the cache control circuit 11 stores the cache usage information A3 also in the second register 11a.

The process switching control circuit 10 then executes the process B3, with the cache usage information A3 specifying that the cache memory 11b should be used information being stored in the second register 11a. In accordance with the cache usage information A3 stored in the second register 11a, the cache control circuit 11 allows data input and output of the cache memory 11b. Accordingly, the process switch control circuit 10 executes the process B3 using the cache memory 11b of the cache control circuit 11.

In this manner, every time processes to be executed are switched, the process switch control circuit 10 stores the cache usage information relating to the next process to be executed in the first register 10a, and the cache control circuit 11 obtains the same cache usage information from the first register 10a and stores it in the second register 11a. In accordance with the cache usage information stored in the second register 11a, the cache control circuit 11 performs data input and output on the cache memory 11b. Accordingly, there is no need to write specific instructions to control the cache memory 11b in the program in which the processes have already been written, and there is no possibility that an irrelevant program will be stored in the cache memory 11b. Thus, each process to be executed is surely stored in the cache memory 11b, so that the cache memory 11b can be used in a more efficient manner and the process speed can be increased.

Every time processes to be executed are switched, the process switch control circuit 10 stores the cache usage information relating to the next process to be executed in the first register 10a. Accordingly, the program of the process to be executed can be freely written with no regard to the space for the cache usage information relating to the next process to be carried out. Thus, the usage control of the cache memory can be facilitated.

Next, a first embodiment of the present invention will be described.

Figure 2:
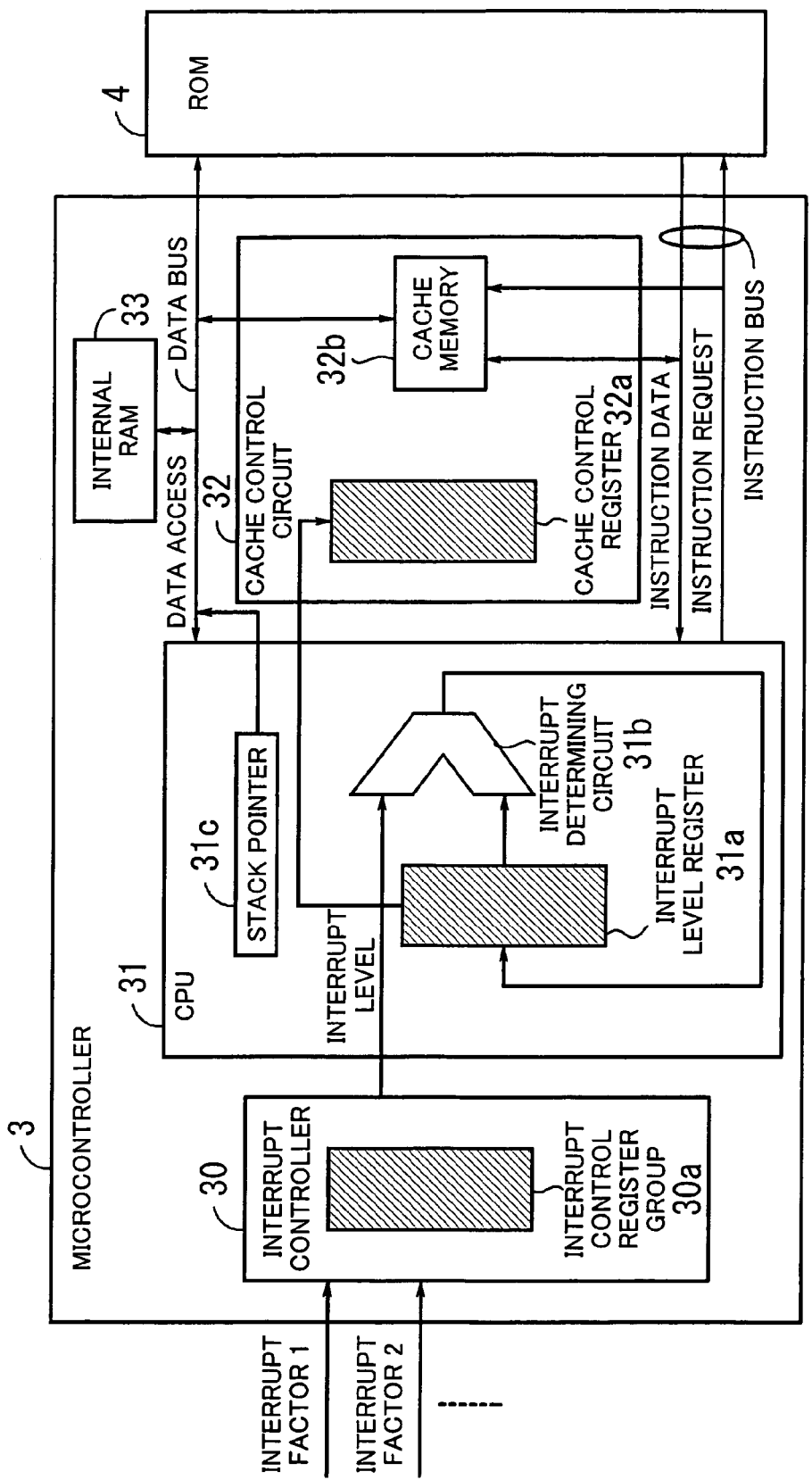
FIG. 2 shows the structure of a microcontroller according to a first embodiment of the present invention.

FIG. 2 shows the structure of a microcontroller according to the first embodiment of the present invention.

In this figure, the microcontroller 3 includes an interrupt controller 30, a CPU 31, a cache control circuit 32, and an internal RAM (Random Access Memory) 33. A ROM 4 is connected to the microcontroller 3. The interrupt controller 30 includes an interrupt control register group 30a. The CPU 31 includes an interrupt level register 31 a, an interrupt determining circuit 31b, and a stack pointer 31c. The cache control circuit 32 includes a cache control register 32a and a cache memory 32b.

The interrupt control register group 30a of the interrupt controller 30 holds the interrupt levels, the cache usage information, and the entry lock information of the interrupt routines corresponding to interrupt factors 1, 2, . . . . The interrupt levels indicate priority levels of the interrupt factors 1, 2 . . . . The cache usage information specifies whether the cache memory 32b should be used in execution of each interrupt routine. The entry lock information specifies whether the contents of the cache memory 32b should be secured so that the data already stored in the cache memory 32b are not replaced with data to be newly stored when the cache memory 32b is being used in execution of an interrupt routine. If the cache memory 32b is entry-locked and there is some non-use area in the cache memory 32b, new data are stored in the non-use area, but not in the other area in which data have already been stored.

The interrupt controller 30 is connected to the interrupt determining circuit 31b. Upon receipt of one of the interrupt factors 1, 2 . . . , the interrupt controller 30 sends the interrupt level corresponding to the received interrupt factor to the interrupt determining circuit 31b of the CPU 31.

The CPU 31 executes the interrupt routine and the main routine stored in the ROM 4 and the cache memory 32b.

The interrupt level register 31a of the CPU 31 holds the interrupt levels, the cache usage information and the entry lock information of the interrupt routine and main routine to be executed by the CPU 31.

The interrupt determining circuit 31b of the CPU 31 compares the interrupt level transmitted from the interrupt controller 30 with the interrupt level stored in the interrupt level register 31a. If the interrupt level transmitted from the interrupt controller 30 is higher than the interrupt level stored in the interrupt level register 31a, the interrupt determining circuit 31b admits the interrupt factor.

The CPU 31 obtains the interrupt level, the cache usage information, and the entry lock information of the admitted interrupt factor from the interrupt control register group 30a, and stores them in the interrupt level register 31a.

The stack pointer 31c of the CPU 31 holds the address of the internal RAM 33. The data size of the internal RAM 33 is 8 bits. When one of the interrupt factors 1, 2, . . . is generated, the stack pointer 31c performs a subtraction on the stored address of the internal RAM 33. The CPU 31 then stores the contents of the interrupt level register 31a at the address of the internal RAM 33 indicated by the stack pointer 31c. After the execution of the interrupt routine, the CPU 31 stores the contents at the address of the internal RAM 33 indicated by the stack pointer 31c back in the interrupt level register 31a. The stack pointer 31c then performs an addition on the stored address of the internal RAM 33. With the data size of the interrupt level register 31a being 8 bits, the subtraction value and the addition value are both "1".

The cache control register 32a of the cache control circuit 32 is connected to the interrupt level register 31a, and holds cache usage information and entry lock information. In accordance with the information stored in the cache control register 32a, the cache control circuit 32 determines whether the interrupt routine and the main routine should be stored in the cache memory 32b. After the cache usage information and the entry lock information are stored in the interrupt level register 31a, the cache control circuit 32 stores them also in the cache control register 32a.

Next, the structure of each register will be described.

Figure 3:
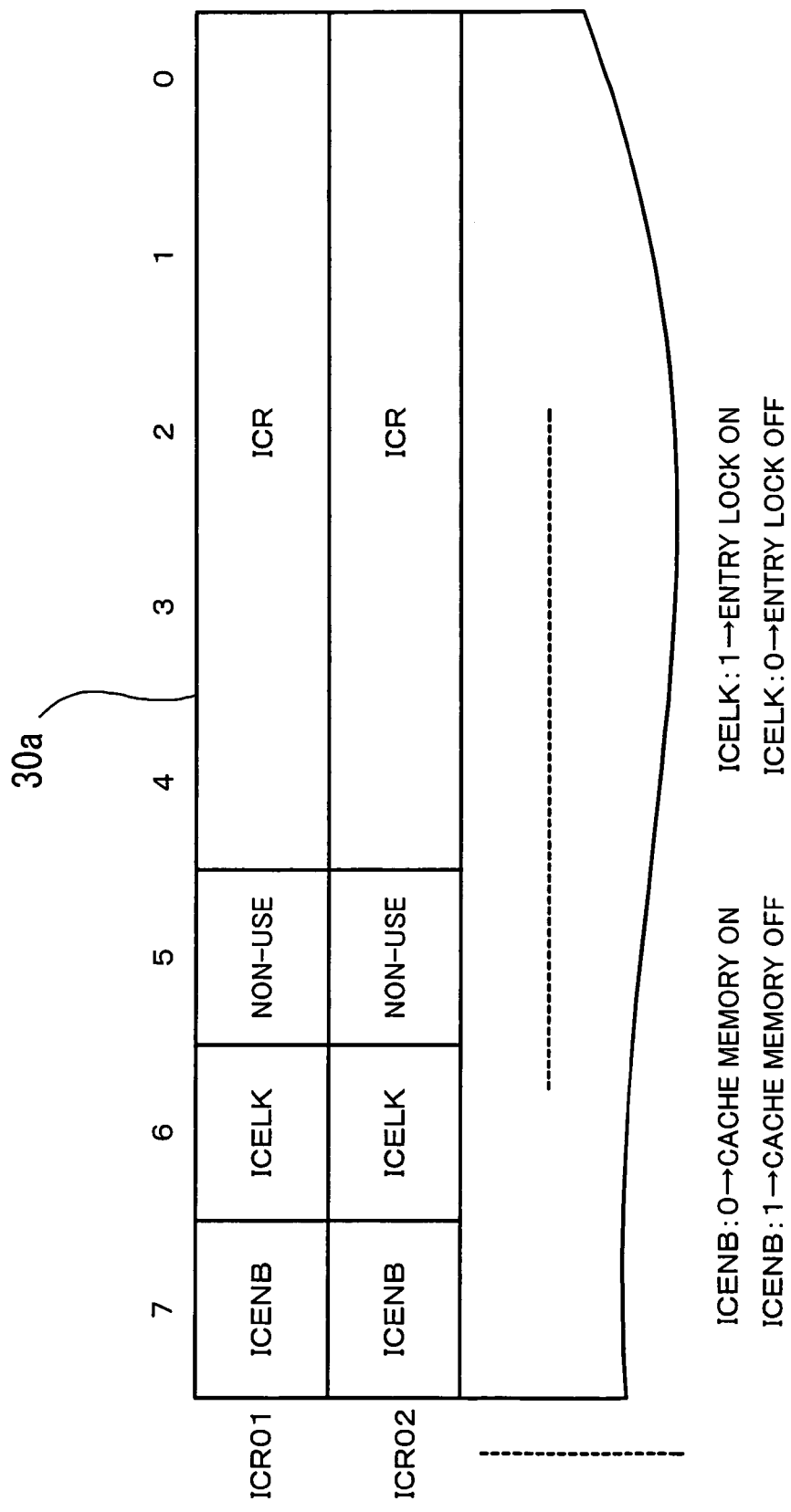
FIG. 3 shows an example of the structure of an interrupt control register group.

FIG. 3 shows an example of the structure of the interrupt control register group. The interrupt control register group 30a is an 8-bit register that holds information corresponding to each of the interrupt factors 1, 2, . . . "ICR01" is a register that holds the information corresponding to the interrupt factor 1. "ICR02" is a register that holds the information corresponding to the interrupt factor 2. Each interrupt level is stored in "ICR" that occupies the bits 0 through 4 of the interrupt control register group 30a. The bit 5 remains not used. The entry lock information is stored in "ICELK" represented by the bit 6. The cache usage information is stored in "ICENB" represented by the bit 7.

Each interrupt level is represented by a 5-bit number and stored in the "ICR". The smaller the number, the higher the interrupt level. More specifically, "00000" represents the highest interrupt level, and "11111" represents the lowest interrupt level.

When the cache memory 32b is to be "entry-locked", "1" is stored in the "ICELK". When the cache memory 32b is not to be "entry-locked", "0" is stored in the "ICELK".

When the cache memory 32b is to be used, "0" is stored in the "ICENB". When the cache memory 32b is not to be used, "1" is stored in the "ICENB".

The interrupt level, the entry lock information, and the cache usage information are stored in the interrupt control register group 30a, when an initialing operation is performed, for example, when the power is turned on.

Figure 4:
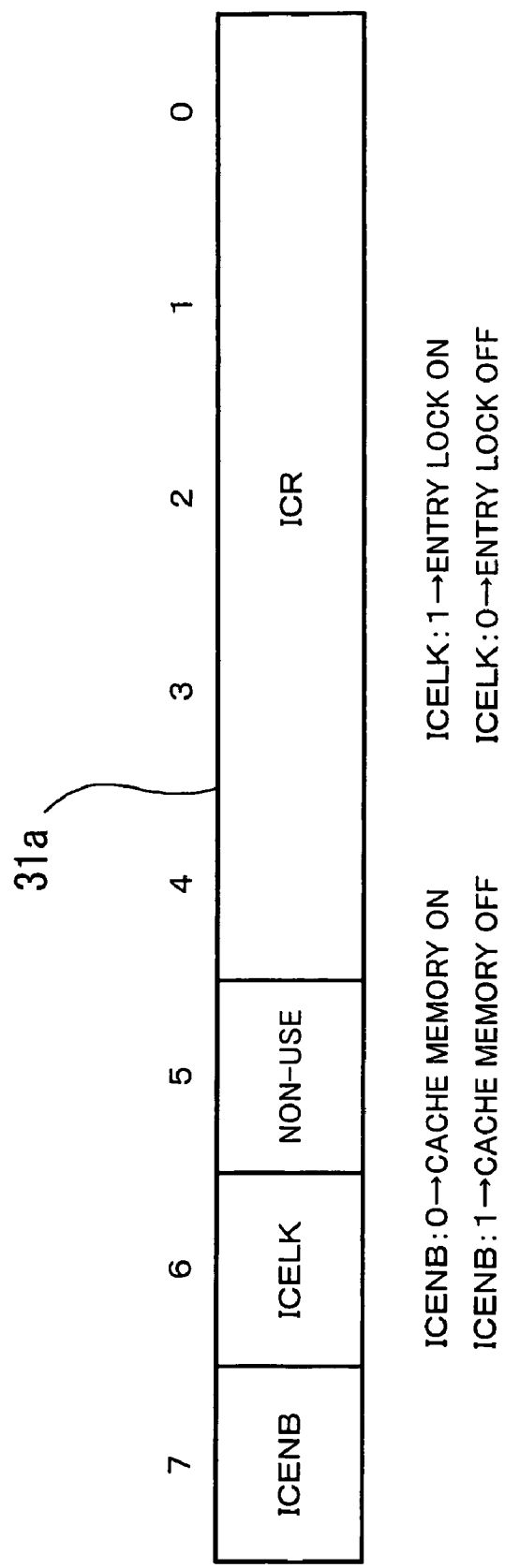
FIG. 4 shows an example of the structure of an interrupt level register.

FIG. 4 shows an example of the interrupt level register. The interrupt level register 31a is an 8-bit register. The interrupt level, the entry lock information, and the cache usage information, which are the same as those stored in the "ICR", "ICELK", and "ICENB" shown in FIG. 3, are stored in the "ICR" represented by the bits 0 through 4, the "ICELK" represented by the bit 6, and the "ICENB" represented by the bit 7, respectively. The bit 5 is a non-use bit.

Figure 5:
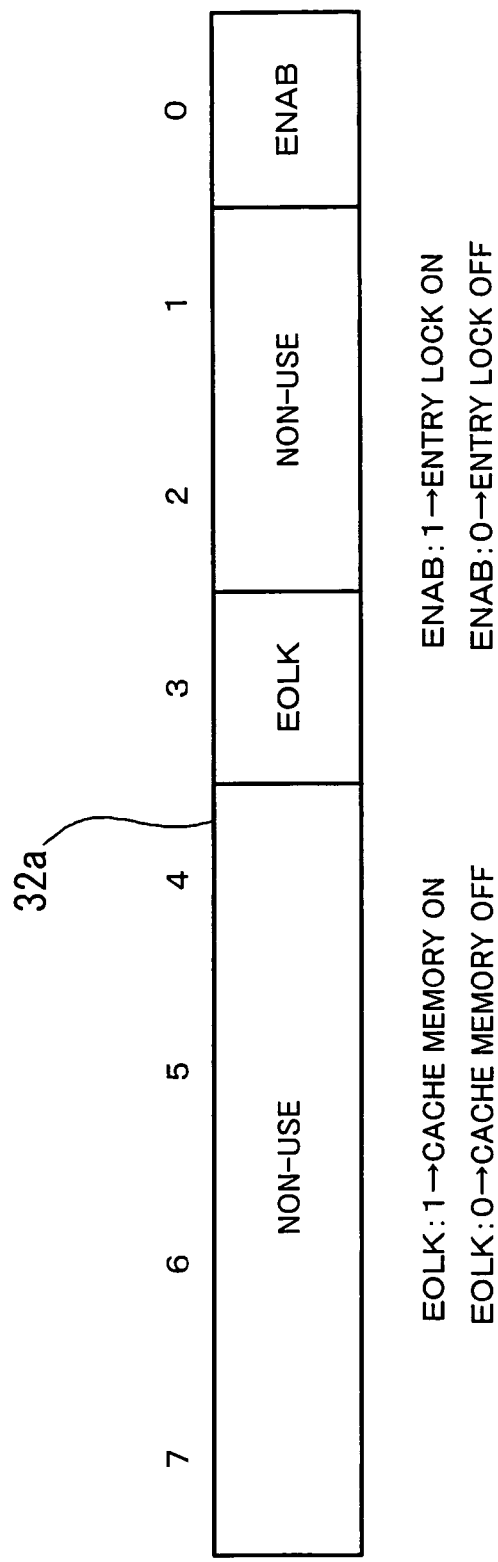
FIG. 5 shows an example of the structure of a cache control register.

FIG. 5 shows an example of the cache control register. The cache control register 32a is an 8-bit register. Information to be used for determining whether the cache memory 32b should be used is stored in "ENAB" represented by the bit 0. The bits 1 and 2 are non-use bits. Information to be used for determining whether the cache memory 32b should be entry-locked is stored in "EOLK" represented by the bit 3. The bits 4 through 7 remain not used.

When "1" is stored in the "EOLK", the cache control circuit 32 entry-locks the cache memory 32b. When "0" is stored in the "EOLK", the cache control circuit 32 does not entry-lock the cache memory 32b.

When "1" is stored in the "ENAB", the cache control circuit 32 puts the cache memory in a usable state. When "0" is stored in the "ENAB", the cache control circuit 32 puts the cache memory 32b in an unusable state.

The main routine represents the regular process, and is allocated the lowest interrupt level. Using the cache memory 32b that is entry-locked, the CPU 31 executes the main routine.

The interrupt factor 1 is allocated the second lowest interrupt level. The CPU 31 executes the interrupt routine corresponding to the interrupt factor 1, with the cache memory 32b being neither entry-locked nor used.

The interrupt factor 2 is allocated the third lowest interrupt level. The interrupt routine corresponding to the interrupt factor 2 is executed by the CPU 31, with the cache memory 32b being neither entry-locked nor used.

In the following, the operation of the microcontroller 3 shown in FIG. 2 will be described in detail.

The CPU 31 executes the main routine, which is the regular process.

When the interrupt factor 1 enters the interrupt controller 30, the interrupt controller 30 sends the interrupt level corresponding to the interrupt factor 1 to the interrupt determining circuit 31b.

The interrupt determining circuit 31b compares the interrupt level sent from the interrupt controller 30 with the interrupt level stored in the interrupt level register 31a. The interrupt level of the main routine that is currently being executed by the CPU 31 is the lowest, and the interrupt level of the interrupt factor 1 is the second lowest. Accordingly, the contents of the register corresponding to the interrupt factor 1 among the interrupt level register group 30a are stored in the interrupt level register 31a. At this point, the stack pointer 31c subtracts "1" from the stored address of the internal RAM 33. The CPU 31 then stores (or stacks) the contents of the interrupt level register 31a in the internal RAM 33.

After the contents of the register in the interrupt control register group 30a are stored in the interrupt level register 31a, the cache control circuit 32 obtains the cache usage information and the entry lock information from the interrupt level register 31a, and stores them in the cache control register 32a. The CPU 31 then executes the interrupt routine corresponding to the interrupt factor 1.

Accordingly, when the CPU 31 executes the interrupt routine corresponding to the interrupt factor 1, the cache usage information and the entry lock information for execution of the interrupt routine have already been set in the cache control register 32a. In accordance with the setting of the cache control register 32a, the cache control circuit 32 controls the cache memory 32b.

After the execution of the interrupt routine corresponding to the interrupt factor 1, the CPU 31 obtains the contents of the internal RAM 33, and stores them back in the interrupt level register 31a. Accordingly, the CPU 31 resumes the execution of the main routine, with the contents of the interrupt level register 31a at the time of suspending the execution of the main routine being restored in the interrupt level register 31a. The stack pointer 31c adds "1" to the stored address of the internal RAM 33.

Even if the interrupt factor 2 is generated while the CPU 31 is executing the interrupt process for the interrupt factor 1, the contents of the interrupt level register 31a are stored at the address of the internal RAM 33 indicated by the stack pointer 31, and are thus temporarily saved as described above. After the execution of the interrupt process for the interrupt factor 2, the contents of the interrupt level register 31 temporarily saved at the address of the internal RAM 33 are stored back in the interrupt level register 31a. Thus, the CPU 31 resumes the execution of the interrupt routine corresponding to the interrupt factor 1.

Next, the operation of the microcontroller 3 will be described, with reference to the transition of the registered value of each register.

Figure 6:
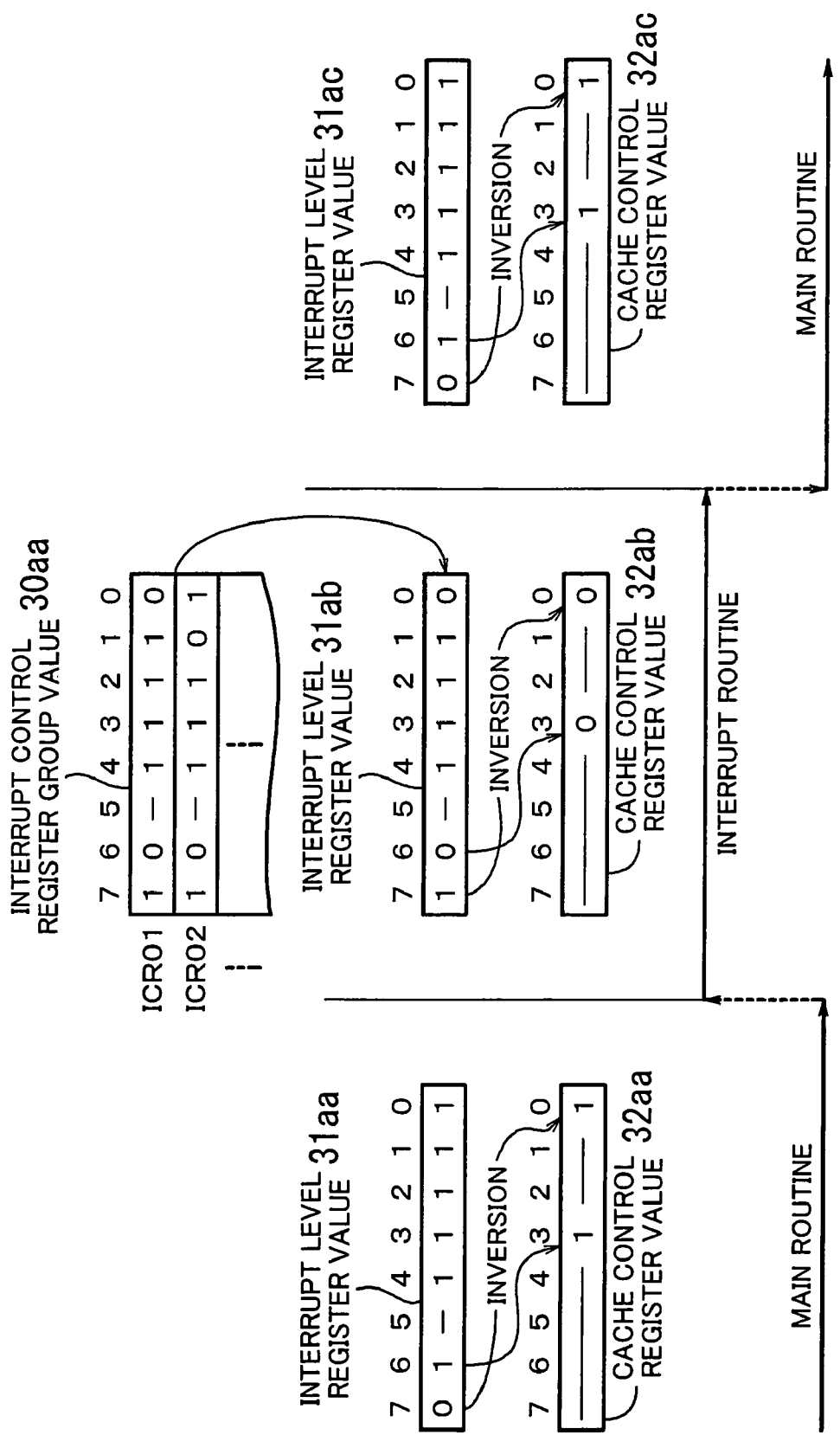
FIG. 6 shows the transition state of the process routine being executed by the CPU 31, and the transition state of each register.

FIG. 6 shows the transition state of the process routine executed by the CPU 31 and the transition state of each register. An interrupt control register group value 30aa represents the values registered in the interrupt control register group 30a. Interrupt level register values 31aa and 31ac represent the values registered in the interrupt level register 31a in the execution of the main routine by the CPU 31. An interrupt level register value 31ab represents the value registered in the interrupt level register 31a in the execution of an interrupt routine by the CPU 31. Cache control register values 32aa and 32ac represent the values registered in the cache control register 32a in the execution of the interrupt routine by the CPU 31. A cache control register value 32ab represents the values registered in the cache control register 32a in the execution of an interrupt routine by the CPU 31.

Where the CPU 31 is executing the main routine, "0" is stored in the "ICENB" (the bit 7) of the interrupt level register 31a, and "1" is stored in the "ICELK" (the bit 6) of the interrupt level register 31a, as indicated by the interrupt level register value 31aa.

The value "1" registered in the "ICELK" (the bit 6) of the interrupt level register 31a is then stored in the "EOLK" (the bit 3) of the cache control register 32a. The inverted value "1" of the value registered in the "ICENB" (the bit 7) of the interrupt level register 31a is stored in the "ENAB" (the bit 0) of the cache control register 32a. Accordingly, the CPU 31 executes the main routine, using the cache memory 32b and the entry lock function.

When the interrupt factor 1 enters the interrupt controller 30, the interrupt determining circuit 31b compares the interrupt level registered in the interrupt level register 31a with the interrupt level registered in the register "ICR01" corresponding to the interrupt factor 1 among the interrupt control register group 30a.

The interrupt level registered in the interrupt level register 31a is "11111", as indicated by the interrupt level register value 31aa. The interrupt level registered in the register "ICR01" of the interrupt control register group 30a is "11110", as indicated by the interrupt control register group value 30aa.

As the interrupt level registered in the register "ICR01" is higher than the interrupt level registered in the interrupt level register 31a, the CPU 31 stores the value of the interrupt level register 31a (or the interrupt level register value 31aa) in the internal RAM 33. The CPU 31 then stores the value of the register "ICR01" in the interrupt level register 31a. As a result, the value of the interrupt level register 31a switches to the interrupt level register value 31ab shown in FIG. 6.

The cache control circuit 32 stores the value of the "ICELK" (the bit 6) of the interrupt level register 31a in the "EOLK" (the bit 3) of the cache control register 32a. The cache control circuit 32 also inverts the value of the "ICENB" (the bit 7) of the interrupt level register 31a, and stores the inverted value in the "ENAB" (the bit 0) of the cache control register 32a. As a result, the value of the cache control register 32a switches to the cache control register value 32ab shown in FIG. 6.

Accordingly, the interrupt routine is executed, without the cache memory 32b and the entry locking.

After the execution of the interrupt routine, the CPU 31 obtains the interrupt level register value 31aa from the internal RAM 33, and stores it in the interrupt level register 31a. As a result, the value of the interrupt level register 31a switches to the interrupt level register value 31ac.

The cache control circuit 32 stores the value of the "ICELK" (the bit 6) of the interrupt level register 31a in the "EOLK" (the bit 3) of the cache control register 32a. The cache control circuit 32 also inverts the value of the "ICENB" (the bit 7) of the interrupt level register 31a, and stores the inverted value in the "ENAB" (the bit 0) of the cache control register 32a. As a result, the value of the cache control register 32a switches to the cache control register value 32ac shown in FIG. 6.

Accordingly, the execution of the main routine is resumed, using the cache memory 32b and the entry lock function. As the registered value of each register is changed in the above manner, the main routine and the interrupt routine are executed.

Next, the operation of rewriting the cache control register 32a of the cache control circuit 32 will be described.

Figure 7:
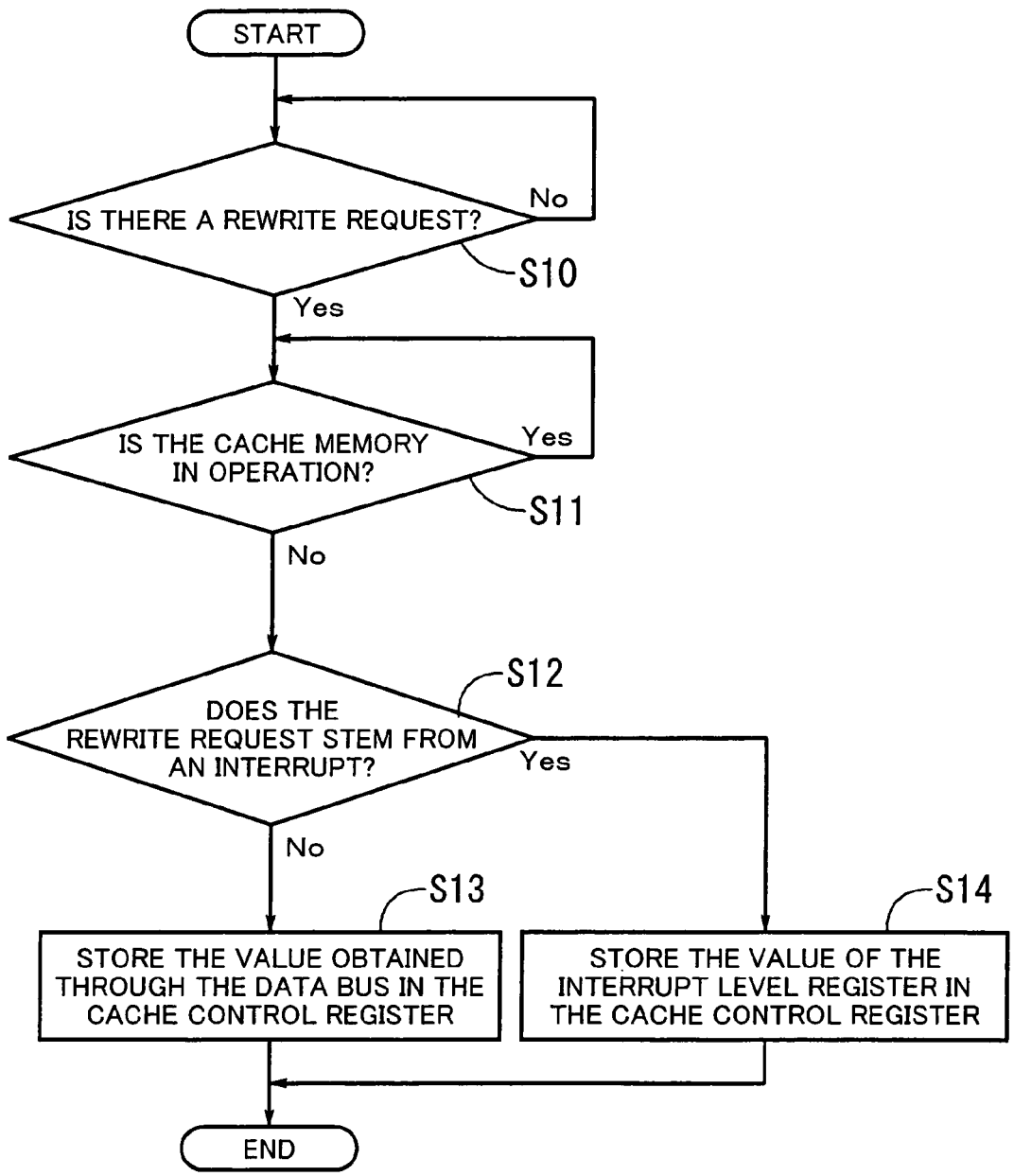
FIG. 7 is a flowchart of an operation of rewriting the cache control register of the cache control circuit.

FIG. 7 is a flowchart showing the operation of rewriting the cache control register of the cache control circuit.

In step S10, the cache control circuit 32 checks whether the CPU 31 has issued a request to rewrite the cache control register 32a. If there is such a request as to rewrite the cache control register 32a, the cache control circuit 32 moves on to step S11. If there is no request, the cache control circuit 32 stands by.

In step S11, the cache control circuit 32 checks whether the cache memory 32b is performing data input and output. If the cache memory 32b is performing data input and output, the cache control circuit 32 stands by. If not, the cache control circuit 32 proceeds to step S12.

In step S12, the cache control circuit 32 determines whether the request to rewrite the cache control register 32a stems from an interrupt factor or the program of the process routine that is being executed by the CPU 31. If the request stems from the program, the cache control circuit 32 proceeds to step S13. If the request stems from an interrupt factor, the cache control circuit 32 proceeds to step S14.

In step S13, the cache control circuit 32 stores the rewrite value supplied from the data bus, to which the CPU 31 and the cache memory 32b are connected, in the cache control register 32a.

In step S14, the cache control circuit 32 stores the value of the interrupt level register 31a in the cache control register 32a.

The storing of a value in the cache control register 32a may be carried out by the CPU 31 executing a specific program instruction, as well as in the above described manner.

Next, the control operation to be performed on the cache memory 32b of the cache control circuit 32 will be described.

Figure 8:
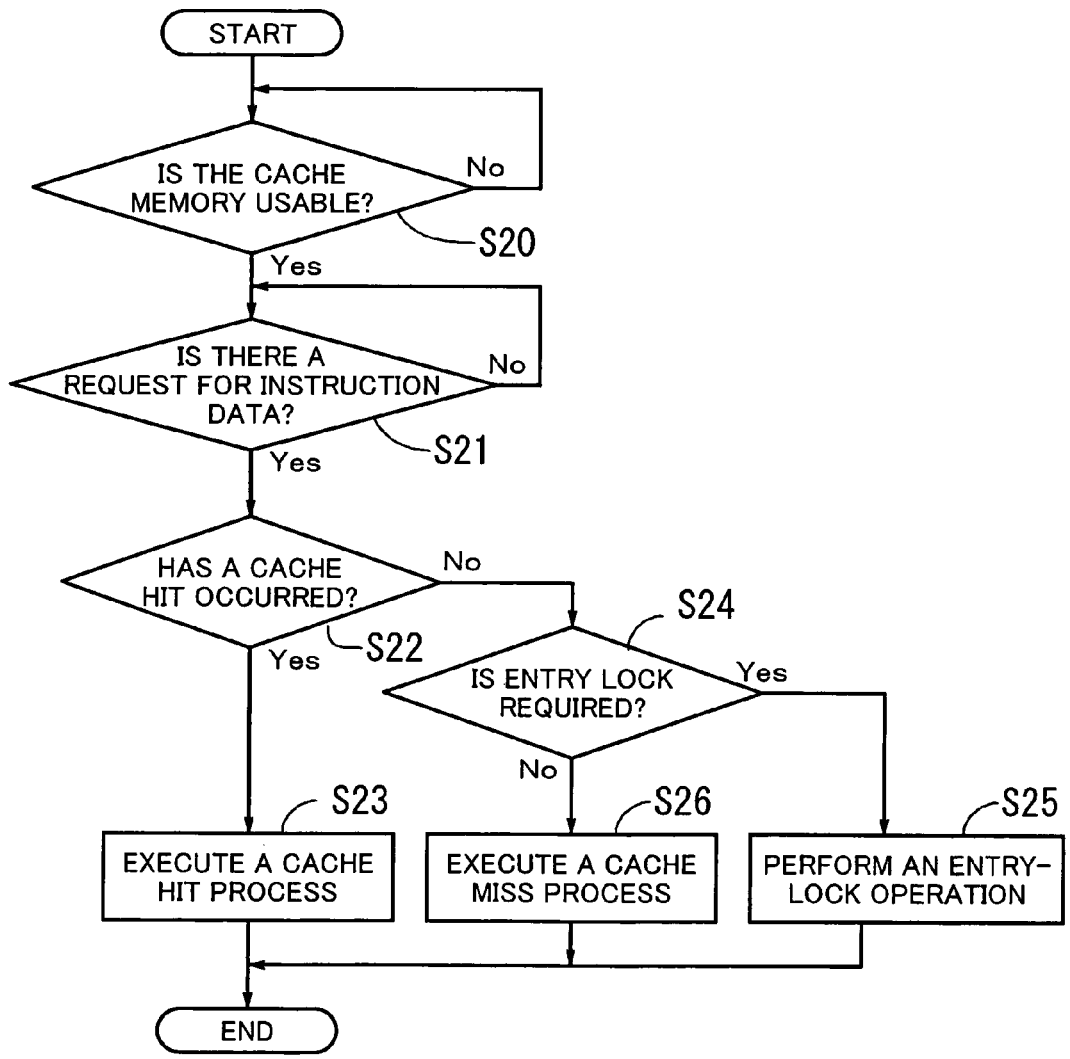
FIG. 8 is a flowchart of a control operation performed on the cache memory by the cache control circuit.

FIG. 8 is a flowchart showing the control operation to be performed on the cache memory on the cache control circuit.

In step S20, the cache control circuit 32 first reads the value of the "ENAB" of the cache control register 32a. If the value of the "ENAB" is "1", the cache control circuit 32 puts the cache memory 32b in a usable state, and moves on to step S21. If the value of the "ENAB" is "0", the cache control circuit 32 puts the cache memory 32b in an unusable state, and stands by.

In step S21, the cache control circuit 32 checks whether the CPU 31 has issued a request for instruction data (all of or a part of the main routine or an interrupt routine) to be processed. If there is a request to the cache memory 32b from the CPU 31 for instruction data, the cache control circuit 32 proceeds to step S22. If there is no request for instruction data, the cache control circuit 32 stands by.

In step S22, the cache control circuit 32 caches the instruction data. If a "cache hit" occurs, the cache control circuit 32 proceeds to step S23. If a "cache miss" occurs, the cache control circuit 32 proceeds to step S24.

In step S23, the cache control circuit 32 executes a "cache hit process". In doing so, the cache control circuit 32 enables the CPU 31 to process the instruction data stored in the cache memory 32b.

In step S24, the cache control circuit 32 reads the value of the "EOLK" of the cache control register 32a. If the value of the "EOLK" is "1", the cache control circuit 32 proceeds to step S25 to perform the entry locking. If the value of the "EOLK" is "0", the cache control circuit 32 proceeds to step S26.

In step S25, the cache control circuit 32 performs the entry locking. If there exists a non-use area in the cache memory 32b, new instruction data obtained by the CPU 31 accessing the ROM 4 are stored in the non-use area. However, the new instruction data are not stored in the area in which other data have already been stored.

In step S26, the cache control circuit 32 executes a "cache miss process". Here, the cache control circuit 32 stores new instruction data obtained by the CPU 31 accessing the ROM 4 in the cache memory 32b.

Every time process routines to be executed are switched, the cache usage information and the entry lock information of the next process routine to be executed are stored in the cache control register 32a by the cache control circuit 32 in the above described manner. Accordingly, there is no need to write specific instructions for the cache usage information in the process routine program, and unnecessary program instructions are not stored in the cache memory 32b. Thus, the process routine to be executed is certainly stored in the cache memory 32b. In this manner, the cache memory 32b can be used in a more efficient manner, and the process speed can be increased accordingly.

Even if a process routine is suspended in the middle of execution, the information stored in the interrupt level register 31a is temporarily saved by the stack pointer 31c and the internal RAM 33. After execution of a new process routine, the temporarily saved information is stored back in the interrupt level register 31a by the stack pointer 31c and the internal RAM 33. Accordingly, the next process routine to be executed can be written in the program with no regard to the cache usage information, and thus the usage control of the cache memory can be facilitated.

Next, a second embodiment of the present invention will be described in detail.

Figure 9:
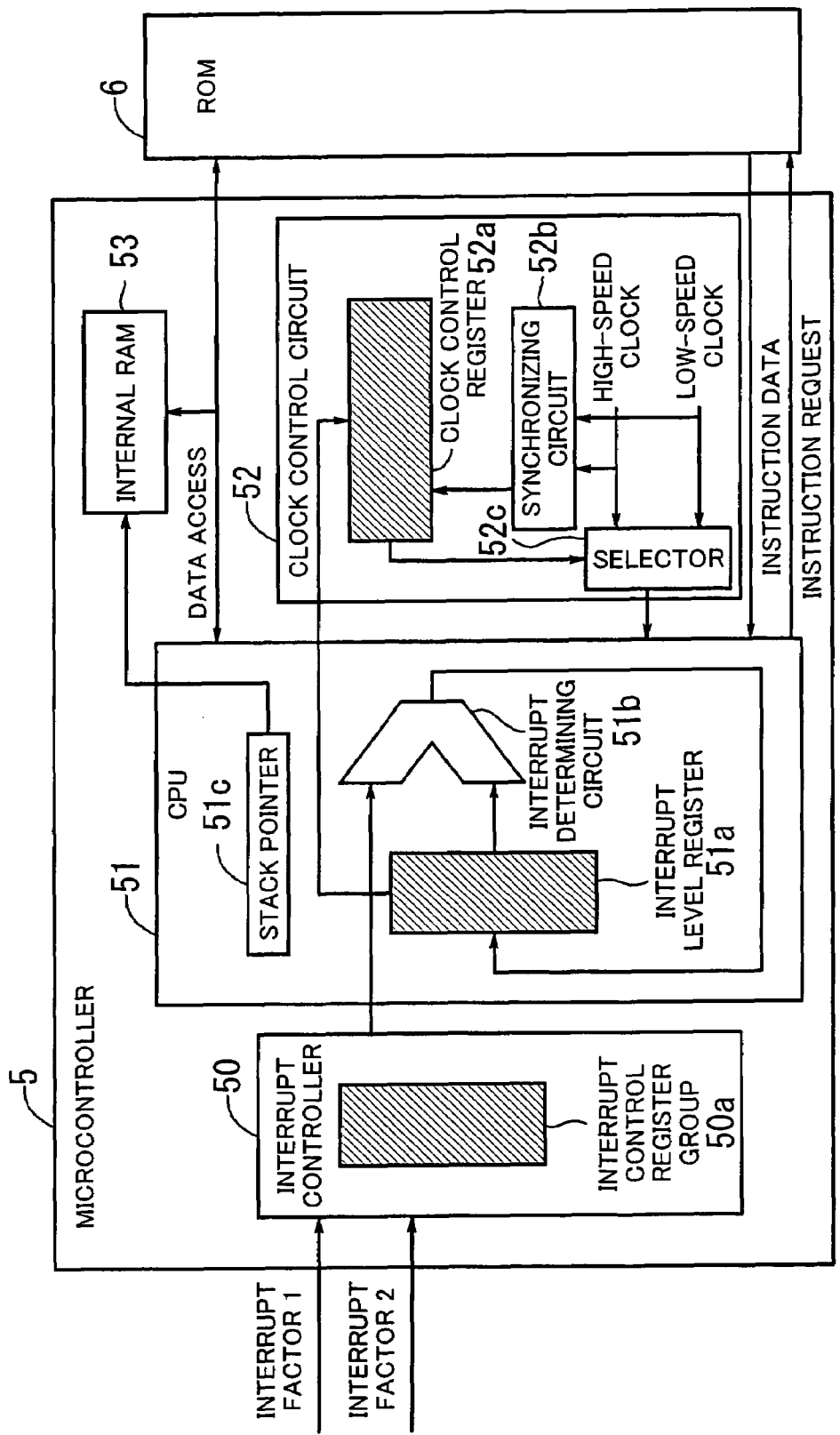
FIG. 9 shows the structure of a microcontroller according to a second embodiment of the present invention.

FIG. 9 shows the structure of a microcontroller according to the second embodiment of the present invention.

In this figure, the microcontroller 5 includes an interrupt controller 50, a CPU 51, a clock control circuit 52, and an internal RAM 53. A ROM 6 is connected to the microcontroller 5. The interrupt controller 50 includes an interrupt control register group 50a. The CPU 51 includes an interrupt level register 51a, an interrupt determining circuit 51b, and a stack pointer 51c. The clock control circuit 52 includes a clock control register 52a, a synchronizing circuit 52b, and a selector 52c.

The interrupt control register group 50a of the interrupt controller 50 holds the interrupt levels and the clock usage information corresponding to interrupt factors 1, 2, . . . . The clock usage information specifies whether the interrupt routine is executed at a high-speed clock or a low-speed clock.

The interrupt controller 50 is connected to the interrupt determining circuit 51b. Upon receipt of one of the interrupt factors 1, 2 . . . , the interrupt controller 50 sends the interrupt level of the received interrupt factor to the interrupt determining circuit 51b of the CPU 51.

The CPU 51 executes the interrupt routine and the main routine stored in the ROM 6. The interrupt level register 51a of the CPU 51 holds the interrupt levels and the clock usage information of the interrupt routine and the main routine to be executed by the CPU 51.

The interrupt determining circuit 51b compares the interrupt level of the interrupt factor supplied from the interrupt controller 50 with the interrupt level stored in the interrupt level register 51a. If the interrupt level supplied from the interrupt controller 50 is higher than the interrupt level stored in the interrupt level register 51a, the interrupt determining circuit 51b admits the interrupt factor. The CPU 51 then obtains the interrupt level and the clock usage information of the received interrupt factor from the interrupt control register group 50a, and store them in the interrupt level register 51a.

The operations of the stack pointer 51c and the internal RAM 53 are the same as the operations of the stack pointer 31c and the internal RAM 33 of the first embodiment, and therefore explanation for them are omitted herein.

The clock control register 52a of the clock control circuit 52 is connected to the interrupt level register 51a, and holds the clock usage information.

The synchronizing circuit 52b outputs a clock that synchronizes with the high-speed clock and the low-speed clock. Specifically, the synchronizing circuit 52b outputs a clock in synchronization with rising or falling of the high-speed clock and the low-speed clock.

The selector 52c outputs the high-speed clock or the low-speed clock in accordance with the clock control information stored in the clock control register 52a.

Here, the main routine that is the regular process is allocated the lowest interrupt level, and is to be executed at the low-speed clock.

The interrupt level of the interrupt factor 1 is the second lowest. The interrupt routine for processing the interrupt factor 1 is to be executed at the high-speed clock.

The interrupt level of the interrupt factor 2 is the third lowest. The interrupt routine for processing the interrupt factor 2 is to be executed at the high-speed clock.

In the following, the operation of the microcontroller shown in FIG. 9 will be described.

The CPU 51 is executing the main routine that is the regular process. When the interrupt factor 1 enters the interrupt controller 50, the interrupt controller 50 sends the interrupt level corresponding to the interrupt factor 1 to the interrupt determining circuit 51b.

The interrupt determining circuit 51b compares the interrupt level supplied from the interrupt controller 50 with the interrupt level stored in the interrupt level register 51a. The interrupt level of the main routine currently being executed is the lowest, and the interrupt level of the interrupt factor 1 is the second lowest. Accordingly, the CPU 51 stores the contents of the register corresponding to the interrupt factor 1 among the interrupt control register group 50a in the interrupt level register 51a. At this point, the stack pointer 51c subtracts "1" from the stored address of the internal RAM 53. The CPU 51 then stores (or stacks) the contents of the interrupt level register 51a in the internal RAM 53.

After the contents of the register corresponding to the interrupt factor 1 among the interrupt control register group 50a are stored in the interrupt level register 51a by the CPU 51, the clock control circuit 52 obtains the clock usage information from the interrupt level register 51a, and stores it in the clock control register 52a in synchronization with a synchronizing clock outputted from the synchronizing circuit 52b.

Figure 10:
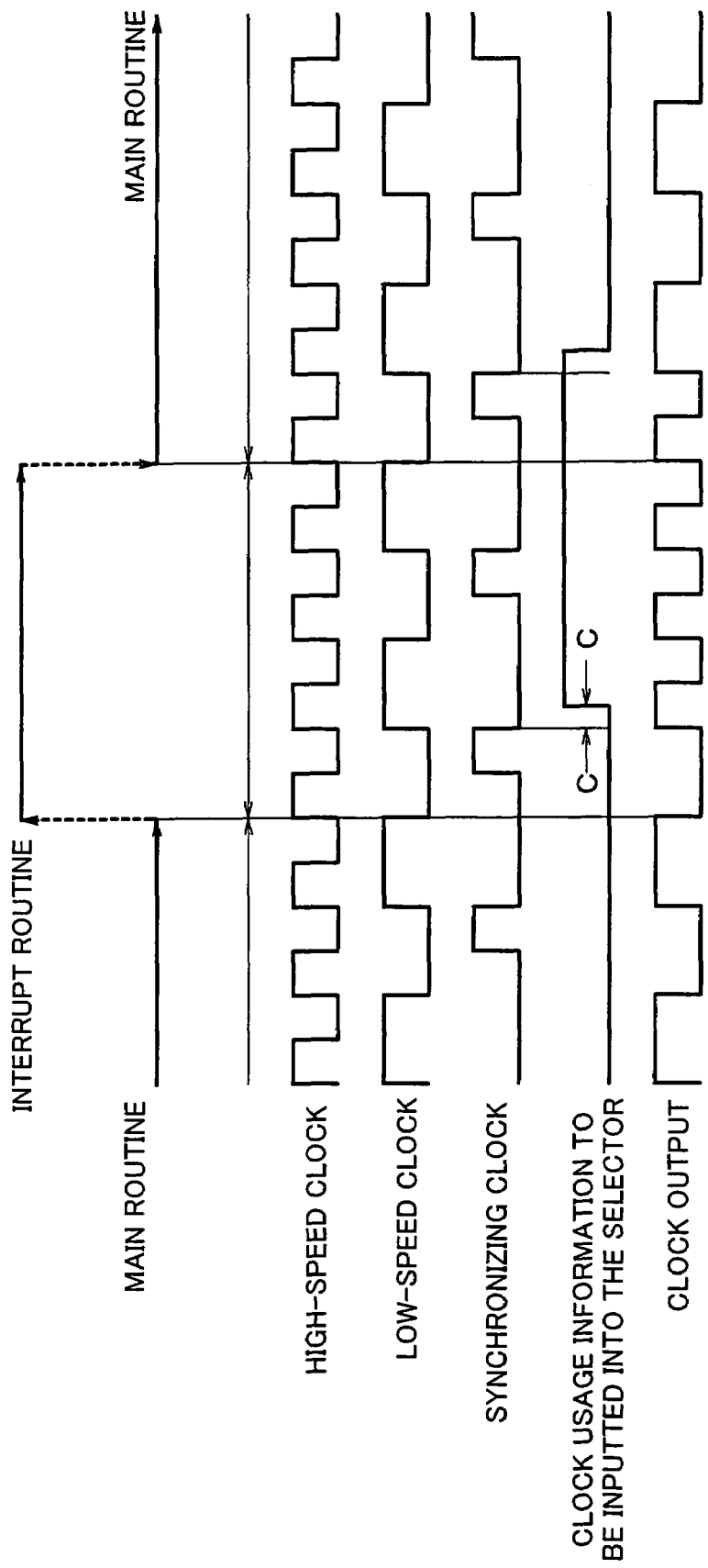
FIG. 10 is a timing chart showing the switching between a low-speed clock and a high-speed clock.

FIG. 10 is a timing chart illustrating the switching between the low-speed clock and the high-speed clock. As shown in FIG. 10, when the high-speed clock and the low-speed clock are both falling, the synchronizing clock is outputted. When the synchronizing clock falls, the clock usage information is stored in the clock control register 52a. In other words, when the CPU 51 switches from the main routine to an interrupt routine, the clock usage information stored in the interrupt level register 51a is sent to the clock control register 52a, but is not stored until the synchronizing clock falls.

The clock usage information stored in the clock control register 52a is next sent to the selector 52c. In the example shown in FIG. 10, the selector 52c outputs the high-speed clock in accordance with the clock usage information. The input of the clock usage information into the selector 52c lags behind the falling of the synchronizing clock (as indicated by the arrows C), because of delay of the circuit.

Figure 11:
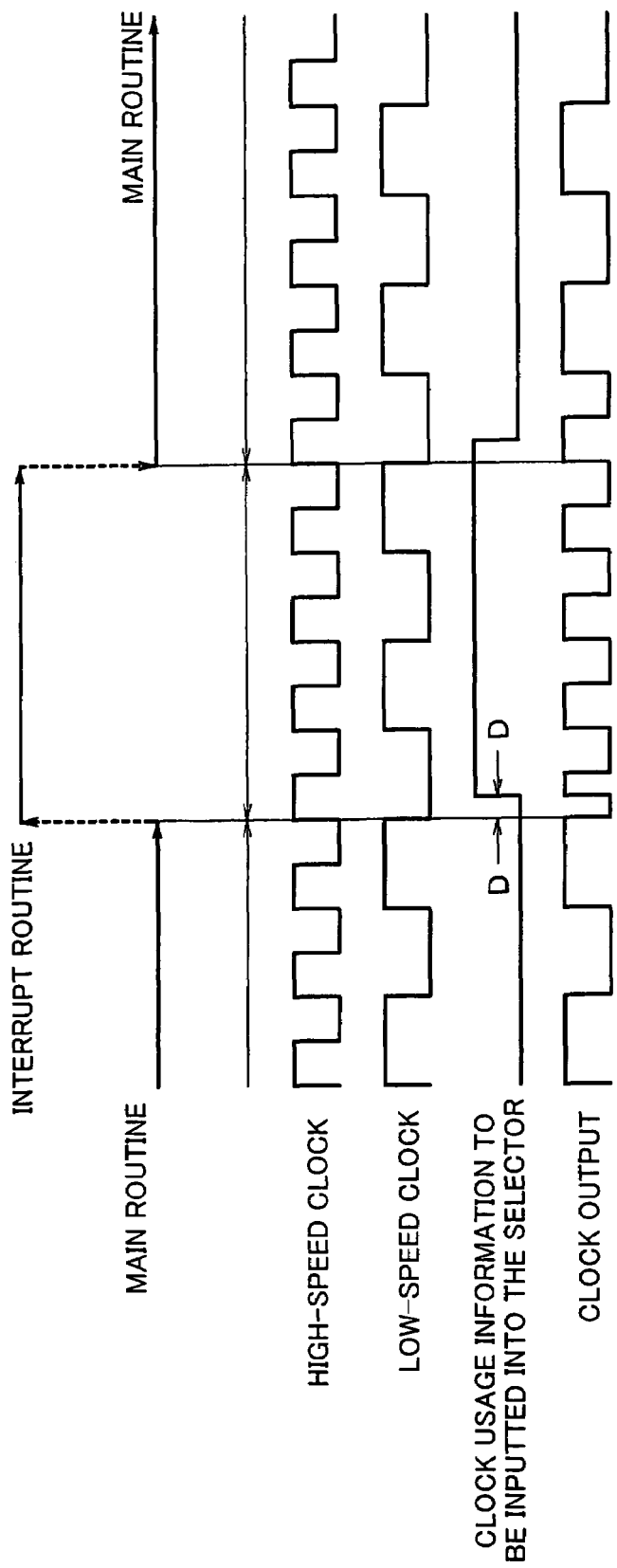
FIG. 11 is a timing chart showing the switching between a low-speed clock and a high-speed clock in a case where a synchronous control is not performed.

FIG. 11 is a timing chart illustrating the switching between the low-speed clock and the high-speed clock in a case where the synchronizing control is not to be performed. With the synchronizing control being not performed, the clock usage information stored in the clock control register 52a is inputted into the selector 52c immediately when the CPU 51 switches from the main routine to an interrupt routine, as shown in FIG. 11. As a result, the clock outputted from the selector 52c has an irregular waveform as shown in FIG. 11. The input of the clock usage information into the selector 52c lags behinds the switching of the CPU 51 from the main routine to the interrupt routine (as indicated by the arrows D), because of delay of the circuit.

Therefore, the switching between the high-speed clock and the low-speed clock is performed in synchronization with the high-speed clock and the low-speed clock, so as to prevent the waveform irregularities caused at the time of clock switching.

After the execution of the interrupt routine corresponding to the interrupt factor 1, the CPU 51 obtains the contents of the interrupt level register 51a from the internal RAM 53, and stores them back in the interrupt level register 51a. Thus, the CPU 51 resumes the execution of the main routine, with the contents of the interrupt level register 51a in the suspended execution of the main routine being stored back in the interrupt level register 51a. The stack pointer 51c adds "1" to the stored address of the internal RAM 53.

Even if the interrupt factor 2 is generated while the CPU 51 is still executing the interrupt routine corresponding to the interrupt factor 1, the contents of the interrupt level register 51a are stored at the address of the internal RAM 53 indicated by the stack pointer 51 c, and thus are temporarily saved. After execution of the interrupt routine corresponding to the interrupt factor 2, the temporarily saved contents of the interrupt level register 51a are stored back in the interrupt level register 51a. Thus, the CPU 51 resumes the execution of the interrupt routine corresponding to the interrupt factor 1.

In this manner, when process routines to be executed are switched, the clock usage information of the next process routine to be executed is stored in the clock control register 52a by the clock control circuit 52. Accordingly, there is no need to write specific instructions to indicate the clock usage information in the process routine program, and the clock switching can be facilitated. Thus, the process speed can be increased.

Even if a process routine is suspended in the middle of execution, the information stored in the interrupt level register 51a is temporarily saved by the stack pointer 51c and the internal RAM 53. After execution of a new process routine, the temporarily saved information is stored back in the interrupt level register 51a by the stack pointer 51c and the internal RAM 53. Accordingly, each process routine program to be executed can be written with no regard to the clock usage information of the next process routine to be executed, and the clock switching control can be facilitated.

Figure 12:
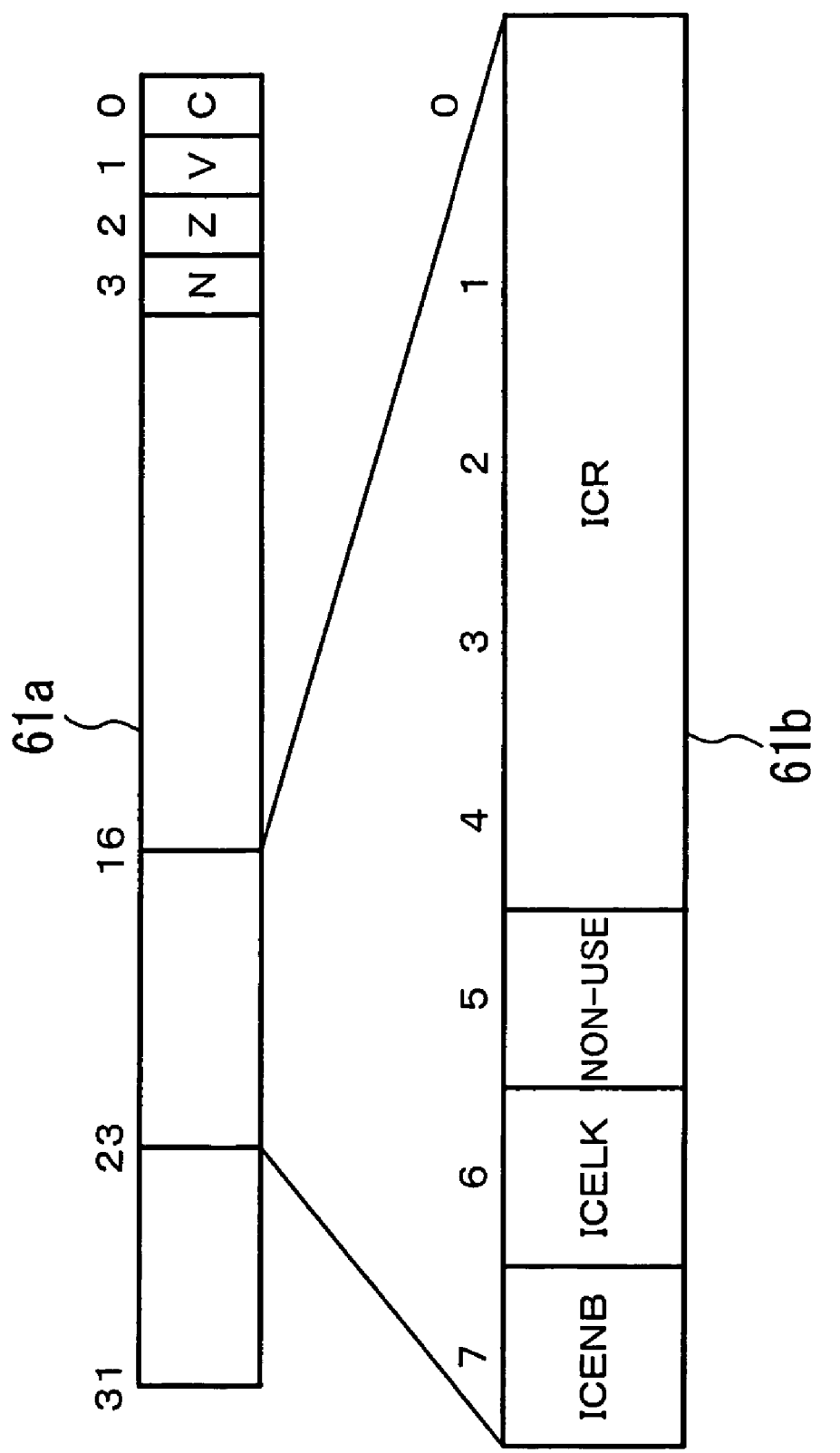
FIG. 12 shows an example of a program status register.
Figure 13:
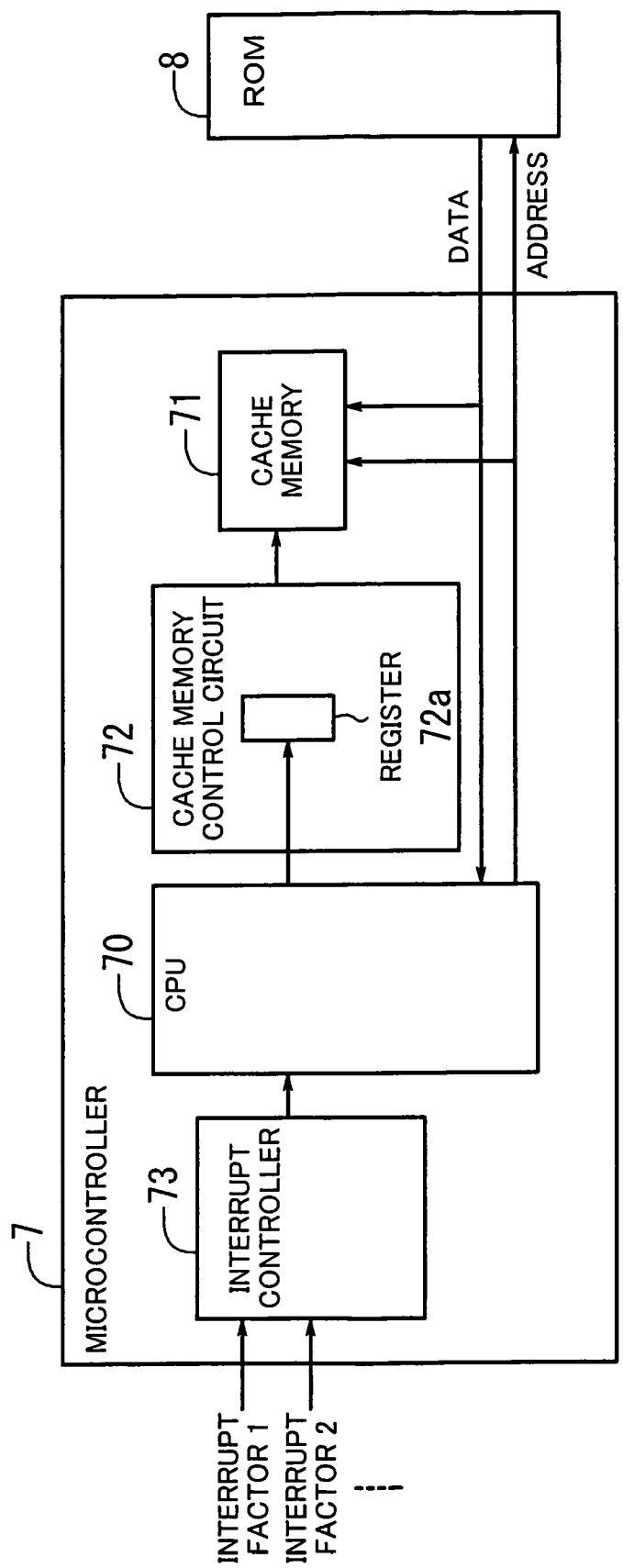
FIG. 13 is a block diagram showing the inner structure of a conventional microcontroller.
Figure 14:
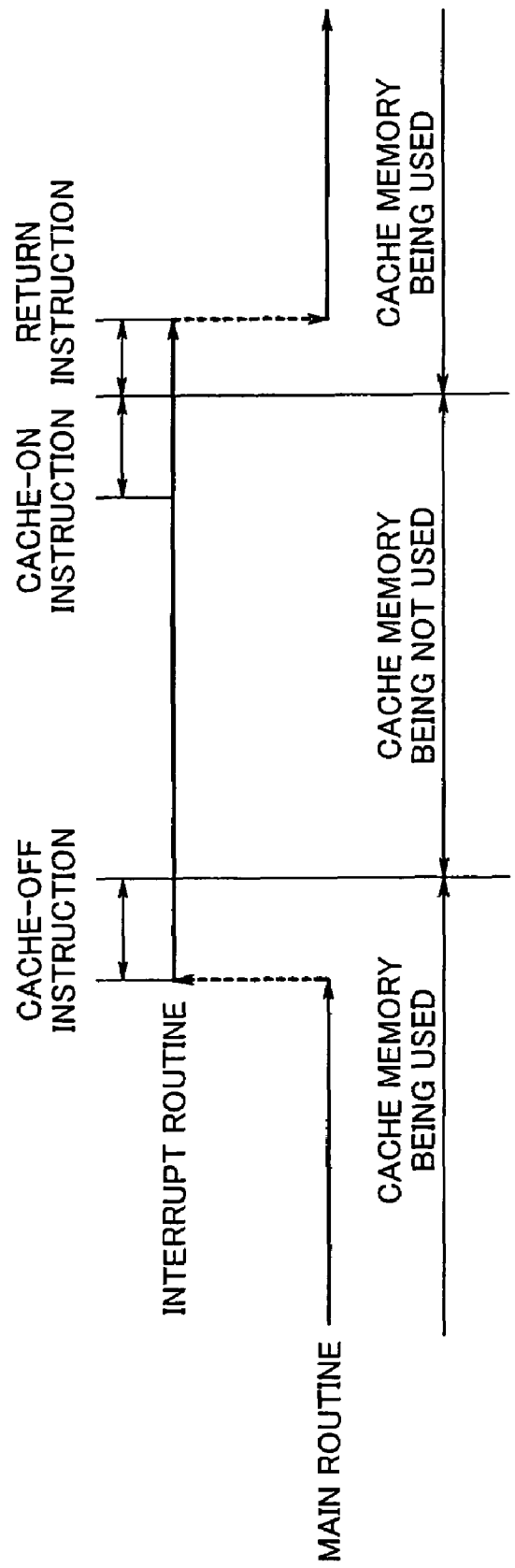
FIG. 14 is a process transition chart of the CPU of the conventional microcontroller.

In general, a microcomputer is equipped with a program status register that determines or checks the initial state. Such a microcomputer stacks the contents of the program status register in execution of an interrupt process. In this case, a part of the non-use area in the program status register is used as the interrupt level register. FIG. 12 shows an example of a program status register. A program status register 61a shown in FIG. 12 is a 32-bit register. In this example, the bits 16 through 23 of the program status register 61a are used as an interrupt level register 61b. With this structure, the stack saving and the return operations can be performed with the conventional circuit. The subtraction value and the addition value for the address of the internal RAM 33 in the stack saving and the return operations are both "4", since the program status register 61$a$ is a 32-bit register while the data size of the internal RAM 33 is 8 bits.

As described so far, in accordance with the present invention, the process switch control circuit stores the cache usage information of the next process in the built-in first register, every time processes to be executed are switched. After the storing of the cache usage information in the first register, the cache control circuit stores the cache usage information in the built-in second register. In accordance with the stored cache usage information, the cache control circuit performs data input and output on the cache memory. Thus, the cache memory can be used in a more efficient manner, and the process speed can be increased.

Also, in accordance with the present invention, the process switch control circuit stores the clock usage information of the next process in the built-in first register, every time processes to be executed are switched. After the storing of the clock usage information in the first register, the clock control circuit stores the clock usage information in the built-in second register. In accordance with the stored clock usage information, the clock control circuit selects and outputs a clock from a plurality of clocks. Thus, the switching of clocks can be facilitated, and the process speed can be increased.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A microcomputer that executes a process in synchronization with a clock, comprising:
    a process switch control circuit that includes a first register, and stores clock usage information specifying which clock is to be used for execution of a next process in the first register every time processes to be executed are switched; and
    a clock control circuit that includes a second register, stores the clock usage information in the second register after the clock usage information has been stored in the first register, and selects and outputs a clock from a plurality of clocks in accordance with the clock usage information stored in the second register
    wherein, when an interrupt is generated, the process switch control circuit obtains the clock usage information corresponding to an interrupt factor from among the clock usage information previously stored in an interrupt control register group, and stores the clock usage information in the first register.

2. The microcomputer according to claim 1, wherein the clock control circuit selects and outputs the clock when the plurality of clocks become synchronous after the storing of the clock usage information in the second register.

3. A method of controlling a clock in a microcomputer that executes a process in synchronization with a clock, the method comprising:
    storing clock usage information specifying which clock is to be used for execution of a next process in a first register every time processes to be executed are switched;
    storing the clock usage information in a second register after the storing thereof in the first register; and
    outputting a clock through a clock output circuit that outputs a plurality of clocks, in accordance with the clock usage information stored in the second register
    wherein, when an interrupt is generated, the clock usage information corresponding to an interrupt factor is obtained from among the clock usage information previously stored in an interrupt control register group, and is stored in the first register.

4. The microcomputer according to claim 1, wherein the first register is a part of a program status register.

5. The method according to claim 3, wherein the first register is a part of a program status register.

* * * * *